(12) United States Patent
Nasimuddin et al.

(10) Patent No.: US 11,024,970 B2
(45) Date of Patent: Jun. 1, 2021

(54) CIRCULARLY POLARIZED ANTENNA FOR RADIO FREQUENCY ENERGY HARVESTING

(71) Applicant: AGENCY FOR SCIENCE, TECHNOLOGY AND RESEARCH, Singapore (SG)

(72) Inventors: Nasimuddin Nasimuddin, Singapore (SG); Muhammad Faeyz Karim, Singapore (SG); Karthik Thothathri Chandrasekaran, Singapore (SG)

(73) Assignee: AGENCY FOR SCIENCE, TECHNOLOGY AND RESEARCH, Singapore (SG)

( * ) Notice: Subject to any disclaimer, the term of this patent is extended or adjusted under 35 U.S.C. 154(b) by 0 days.

(21) Appl. No.: 16/637,230

(22) PCT Filed: Aug. 6, 2018

(86) PCT No.: PCT/SG2018/050399
§ 371 (c)(1),
(2) Date: Feb. 6, 2020

(87) PCT Pub. No.: WO2019/032047
PCT Pub. Date: Feb. 14, 2019

(65) Prior Publication Data
US 2020/0168996 A1      May 28, 2020

(30) Foreign Application Priority Data
Aug. 7, 2017    (SG) ............................ 10201706417P

(51) Int. Cl.
*H01Q 9/04*     (2006.01)
*H01Q 5/307*    (2015.01)
(Continued)

(52) U.S. Cl.
CPC ........... *H01Q 9/0428* (2013.01); *H01Q 5/307* (2015.01); *H01Q 5/50* (2015.01); *H01Q 9/0414* (2013.01); *H02J 50/27* (2016.02)

(58) Field of Classification Search
CPC ........ H01Q 9/0428; H01Q 5/307; H01Q 5/50; H01Q 9/0414; H01Q 9/0464; H01Q 9/0492; H02J 50/27; H02J 50/005; H02J 50/001
See application file for complete search history.

(56) References Cited

U.S. PATENT DOCUMENTS 9,929,587 B2 *  3/2018  Narayanan ............... H01Q 3/26
9,935,370 B2 *  4/2018  Casse ..................... H01Q 1/248
(Continued)

FOREIGN PATENT DOCUMENTS

CN       104103906 A        10/2014
WO    WO 2019032047 A1      2/2019
WO    WO-2019032047 A1 *    2/2019    .......... H01Q 9/0428

OTHER PUBLICATIONS

International Search Report, International Application No. PCT/SG2018/050399, filed Aug. 6, 2018.
(Continued)

*Primary Examiner* — Vibol Tan
(74) *Attorney, Agent, or Firm* — George S. Blasiak; Heslin Rothenberg Farley & Mesiti PC

(57) ABSTRACT

A circularly polarized (CP) antenna for Radio Frequency energy harvesting comprising: a top substrate; a bottom substrate disposed on a ground plane; a middle substrate disposed between the top substrate and the bottom substrate; a slotted patch comprising more than one slots, the slotted patch being disposed on the top substrate; a slitted patch comprising a plurality of slits, the slitted patch being disposed between the top substrate and the middle substrate; a microstrip feed line disposed between the middle substrate
(Continued)

Cross-sectional view of the proposed dual-band CP antenna

Top view of Slotted-circular patch and the bottom substrate; and a via connecting the slotted-circular-patch and the microstrip feed line to enable the slotted-circular-patch to be fed by the microstrip feed line, wherein the more than one slots and the slits are arranged so as to generate more than one orthogonal modes with equal magnitude for receiving RF signals.

14 Claims, 12 Drawing Sheets

(51) Int. Cl.
*H02J 50/27* (2016.01)
*H01Q 5/50* (2015.01)

(56) References Cited

U.S. PATENT DOCUMENTS

| | | | |
|---|---|---|---|
| 10,468,783 B2* | 11/2019 | Soodmand | H01Q 21/064 |
| 10,476,293 B2* | 11/2019 | Trogan | H01Q 1/38 |
| 10,862,200 B2* | 12/2020 | Shao | H01Q 9/0407 |
| 2018/0205144 A1* | 7/2018 | Huang | H01Q 21/245 |
| 2019/0260239 A1* | 8/2019 | Coelho De Souza | H01Q 1/38 |

OTHER PUBLICATIONS

Abbaspour M. et al. "*WideBand Star-Shaped Microstrip Patch Antenna*" Progress in Electromagnetics Research Letters, vol. 1, pp. 61-68, dated Jan. 31, 2008.

"Comparative Study of Antenna Designs for RF Energy Harvesting", Hindawi Publishing Corporation, International Journal of Antennas and Propagation, Publication Date: 2013, Authors: Sika Shrestha, Sun-Kuk Noh, and Dong-You Choi, vol. 2013, Article ID 385260.

"Compact Circularly Polarized Rectemia With Unbalanced Circular Slots", IEEE Transactions on Antennas and Propagation, vol. 56, No. 3, Mar. 2008, Authors: Tzong-Chee Yo, Chien-Ming Lee, Chen-Ming Hsu, and Ching-Hsing Luo.

"A new compact size microstrip patch antenna with irregular slots for handheld GPS application" University of Iraq, Eng. & Technology, vol. 26, No. 10, Published in 2008, Author: Jawad K. Ali.

Ang M.J. et al.: "A Proximity-coupled Circularly Polarized Slotted-Circular Patch Antenna for RF Energy Harvesting Applications", IEEE Region 10 Conference (Tencon)—Proceedings of the International Conference, Nov. 25, 2016 (Nov. 25, 2016), pp. 2027-2030, XP033062544, [retrieved on Oct. 15, 2018], DOI: doi:10.1109/TENCON.2016.7848381CC=XP; XP033062544 (Cat. A)

Ong L.C. et al.: "Overview of Antennas for RF Energy Harvesting", 2014 IEEE—APS Topical Conference on Antennas and Propagation in Wireless Communications (APWC, Aug. 9, 2014 (Aug. 9, 2014), pp. 209-212, XP032646219, [retrieved on Oct. 15, 2018], DOI: doi:10.1109/APWC.2014.6905541CC=XP; XP032646219 (Cat. A).

* cited by examiner

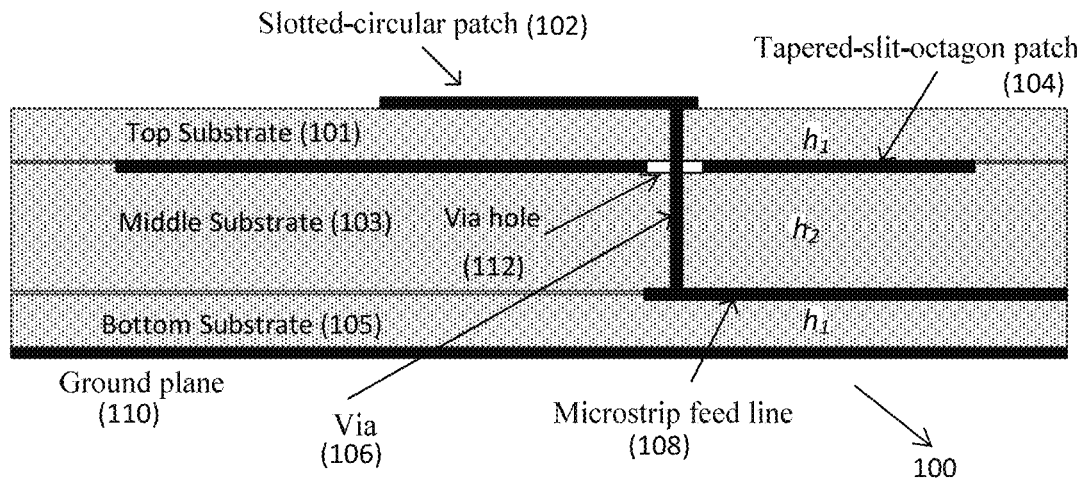
Figure 1A - Cross-sectional view of the proposed dual-band CP antenna
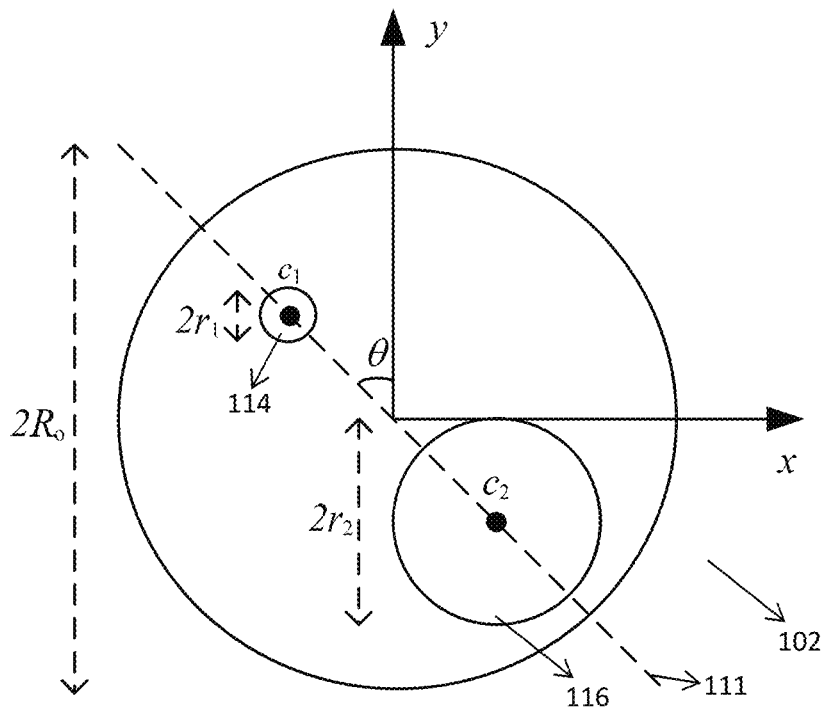
Figure 1B – Top view of Slotted-circular patch

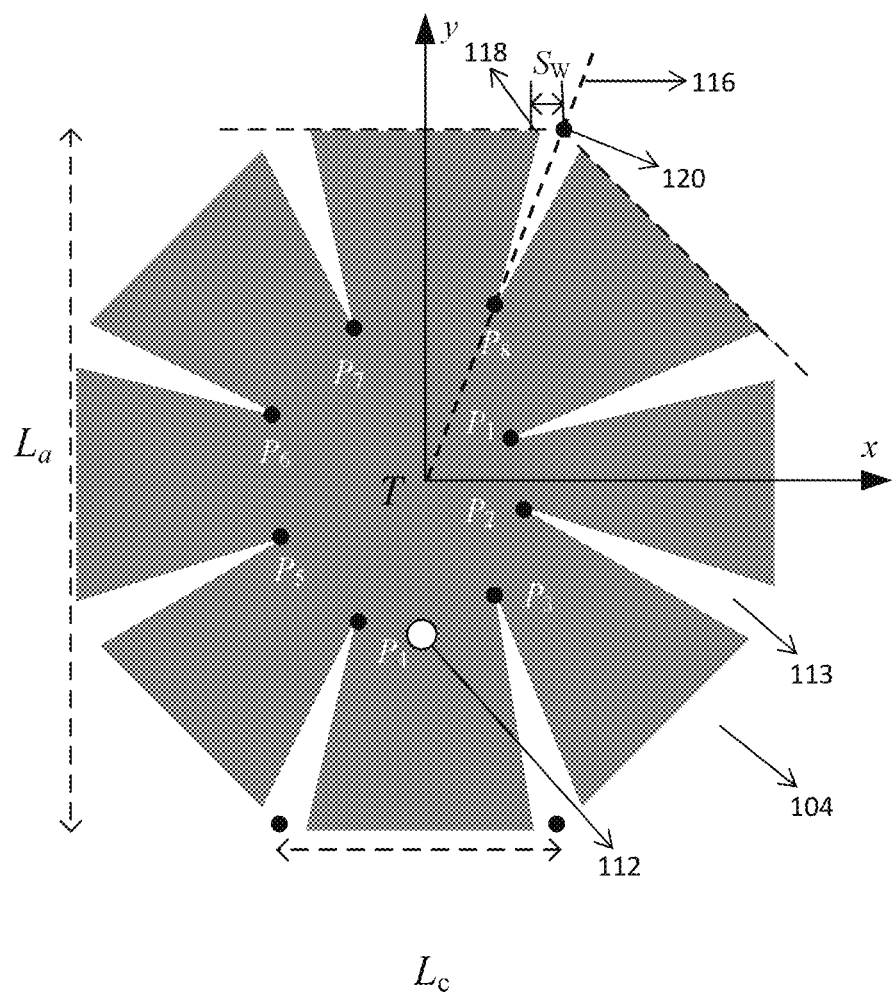
Figure 1C – Top view of Tapered-Slit-Octagon Patch

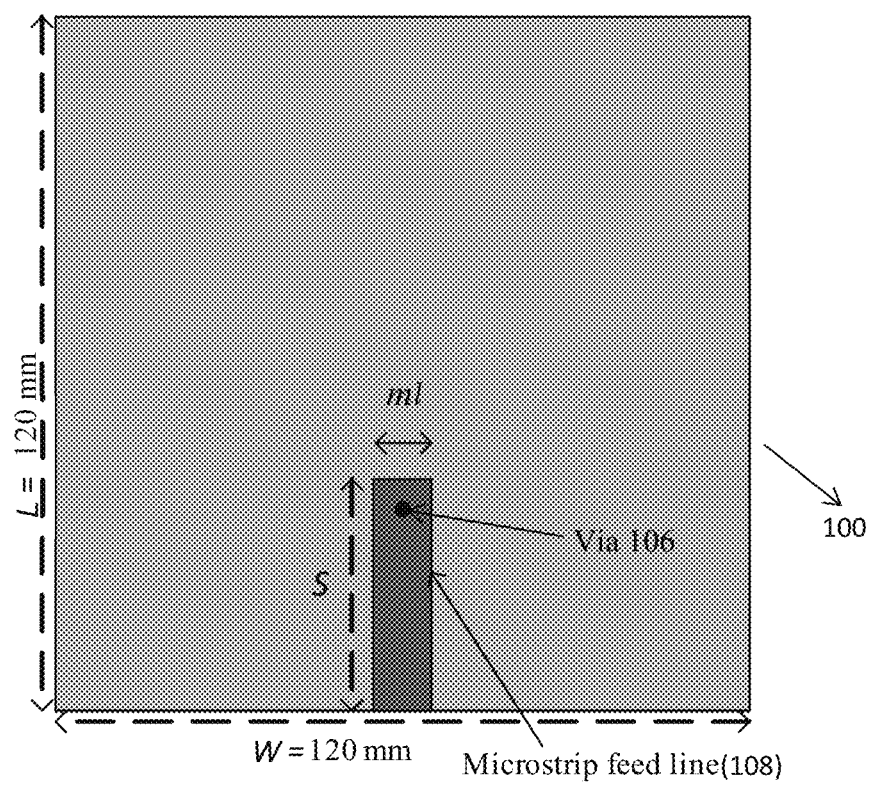
Figure 1D - Proximity coupled microstrip feed line.
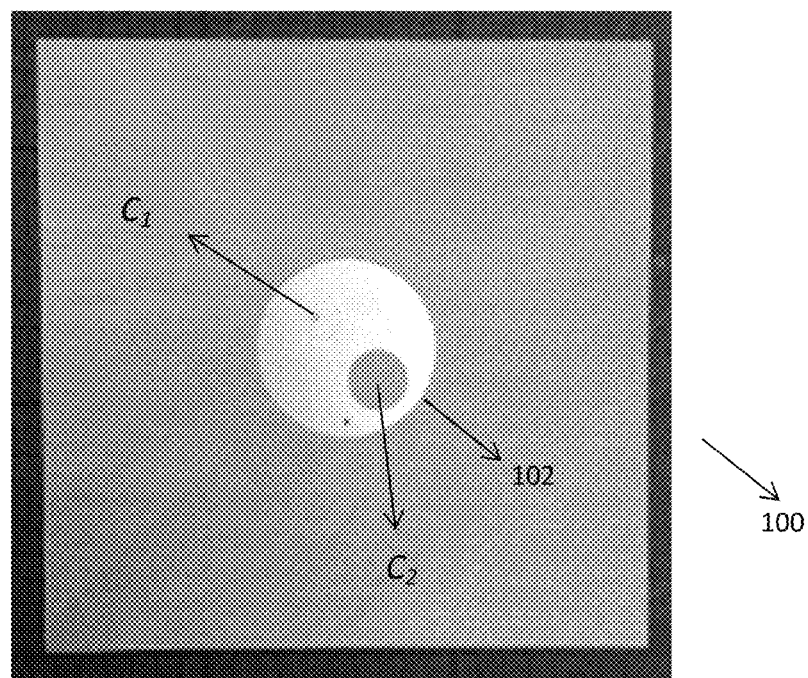
Figure 1E - Photograph of a top view of a prototype dual-band CP antenna

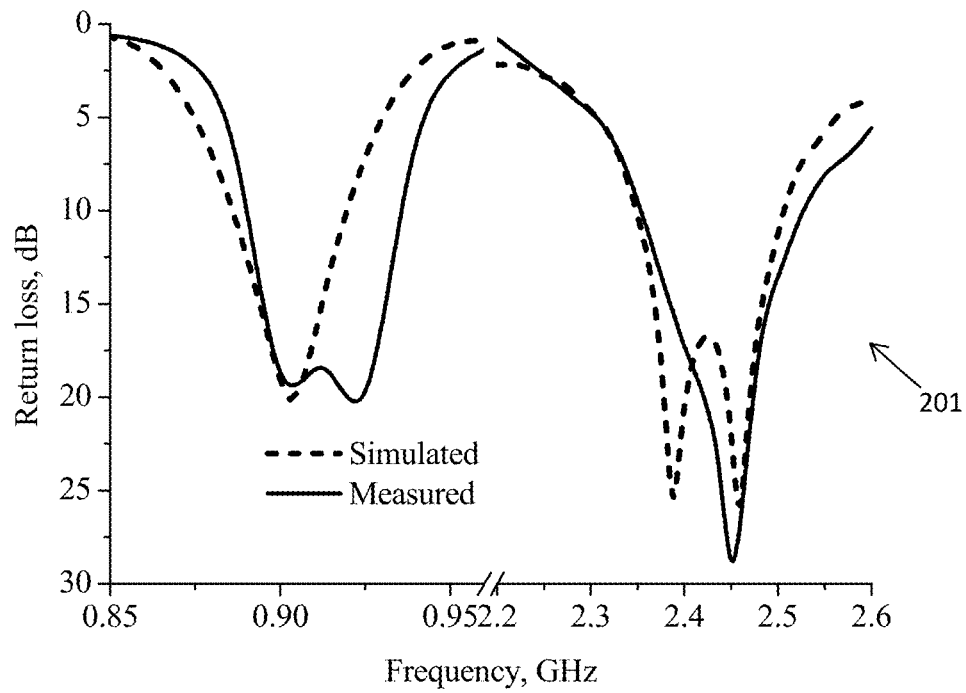
Figure 2A - Measured and simulated return loss of the dual-band CP antenna.
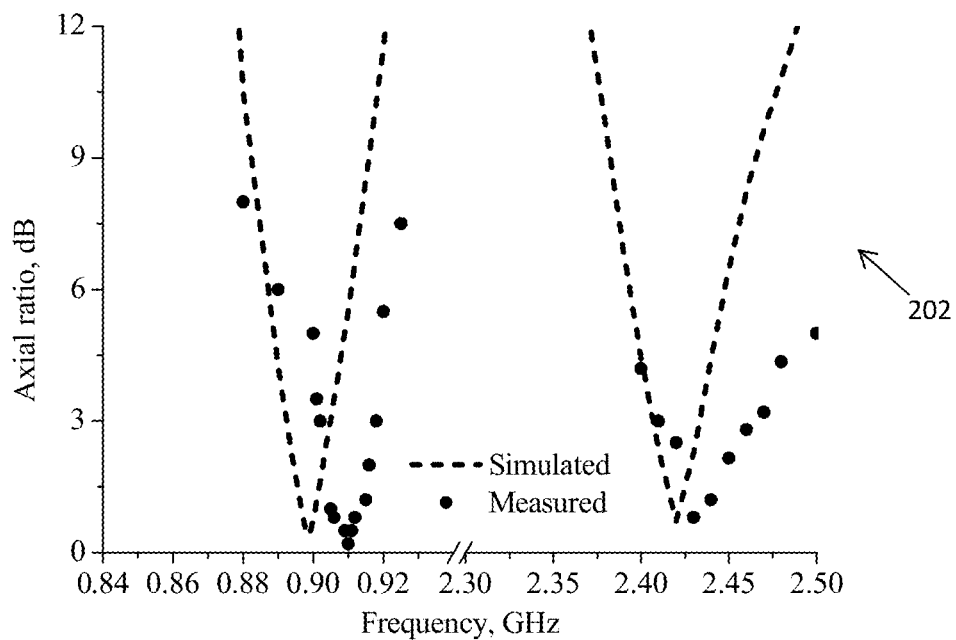
Figure 2B - Measured and simulated axial-ratio at the boresight of the dual-band CP antenna

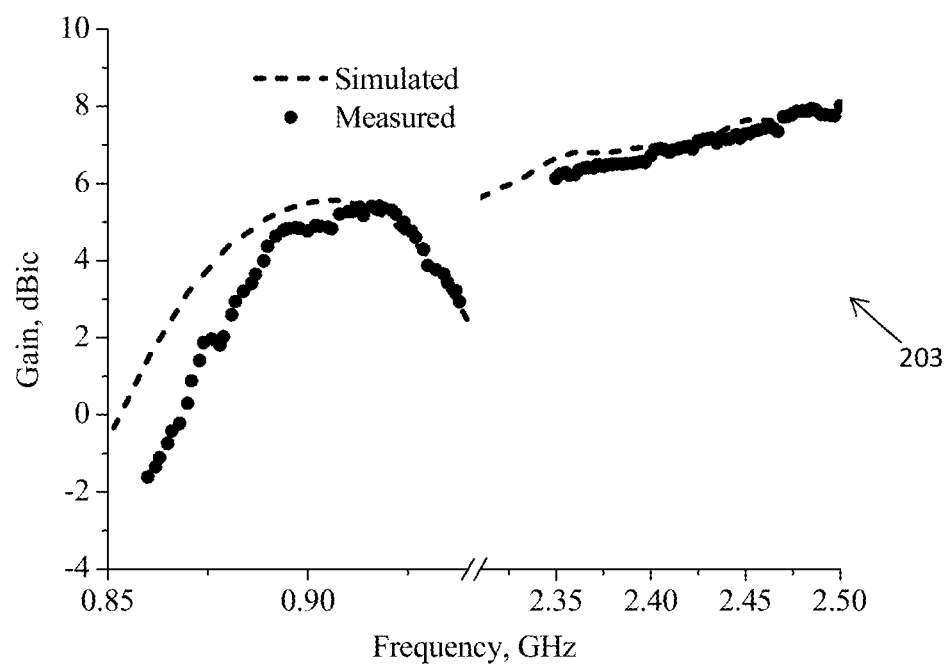
Figure 2C - Measured and simulated gain at the boresight of the dual-band CP antenna.

*WiFi-Band*
XZ plane
$f = 2.43$ GHZ

208

*WiFi-Band*
XZ plane
$f = 2.41$ GHZ

209

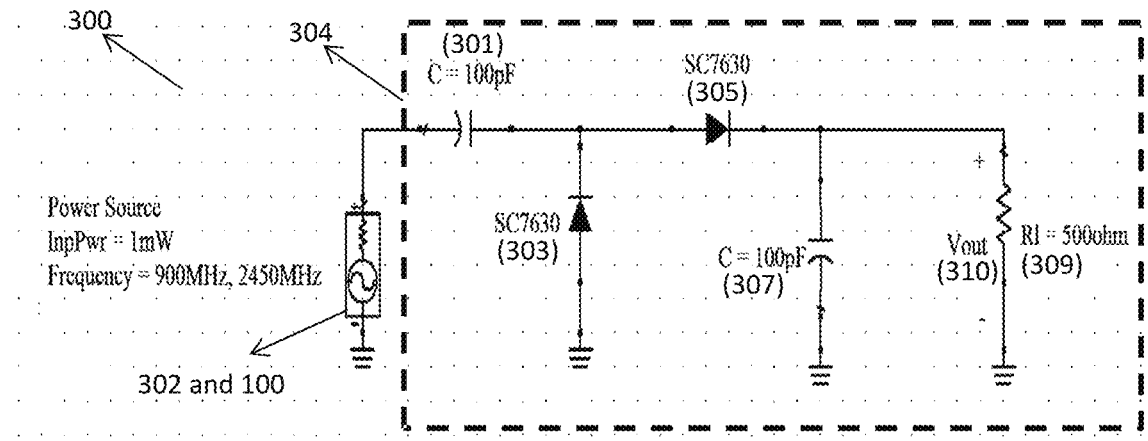
Figure 3A - Voltage doubler circuit configuration
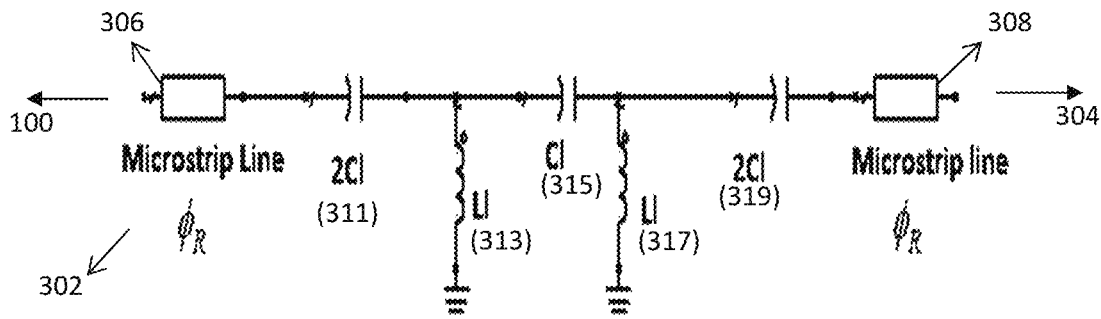
Figure 3B - 2-unit cell CRLH TL constructed using a combination of microstrip line of electrical length and lumped components
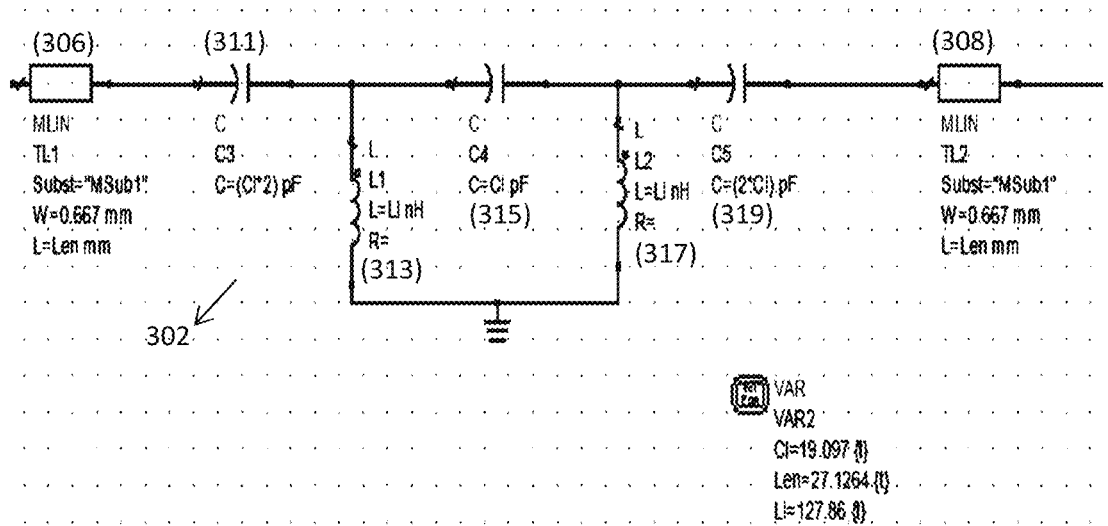
Figure 3C - Dual-band CRLH based impedance matching circuit

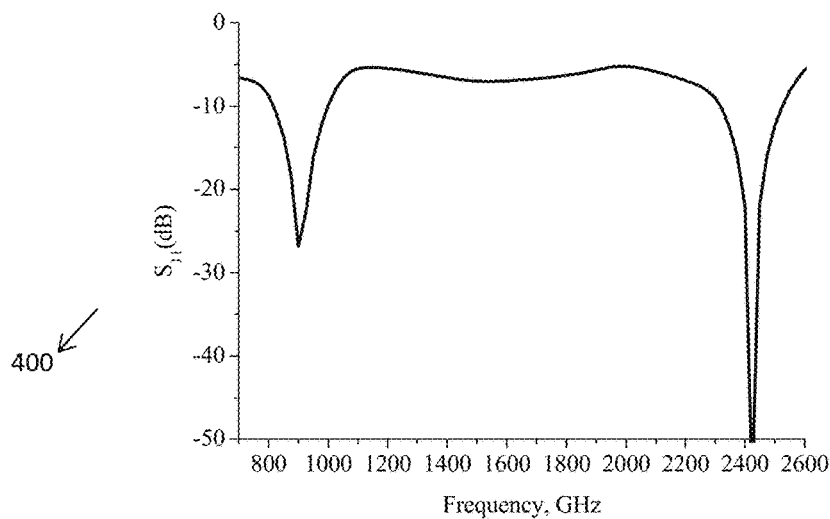
Figure 4 - S11 of the dual band rectifier for an input power of 0 dBm.
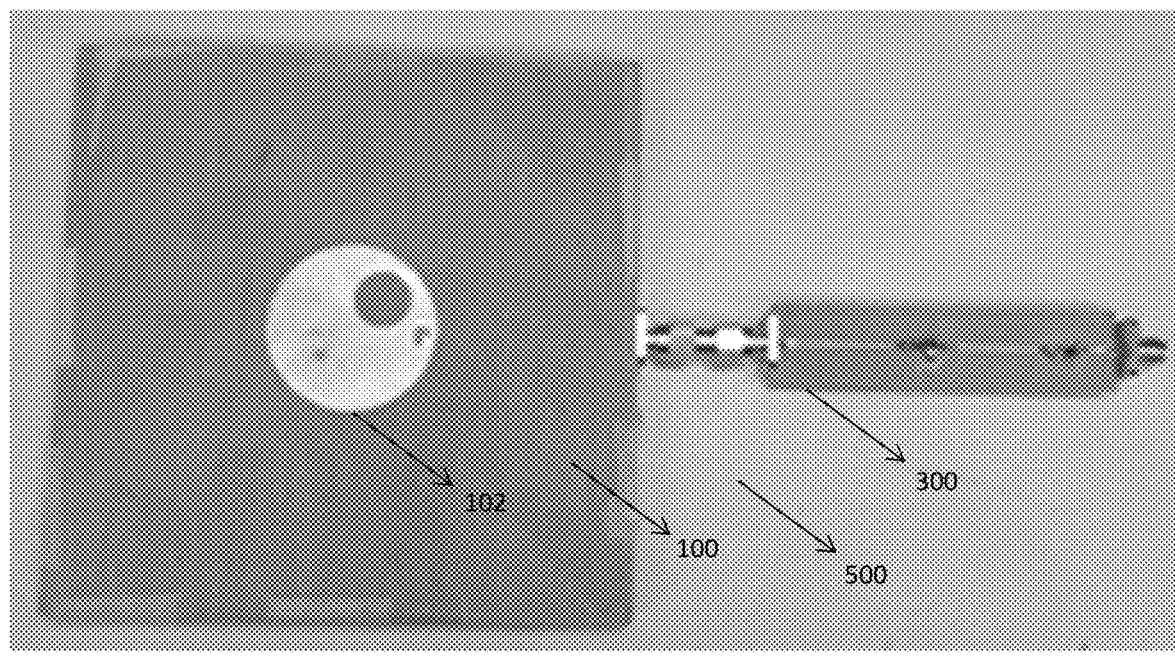
Figure 5 - CP rectenna

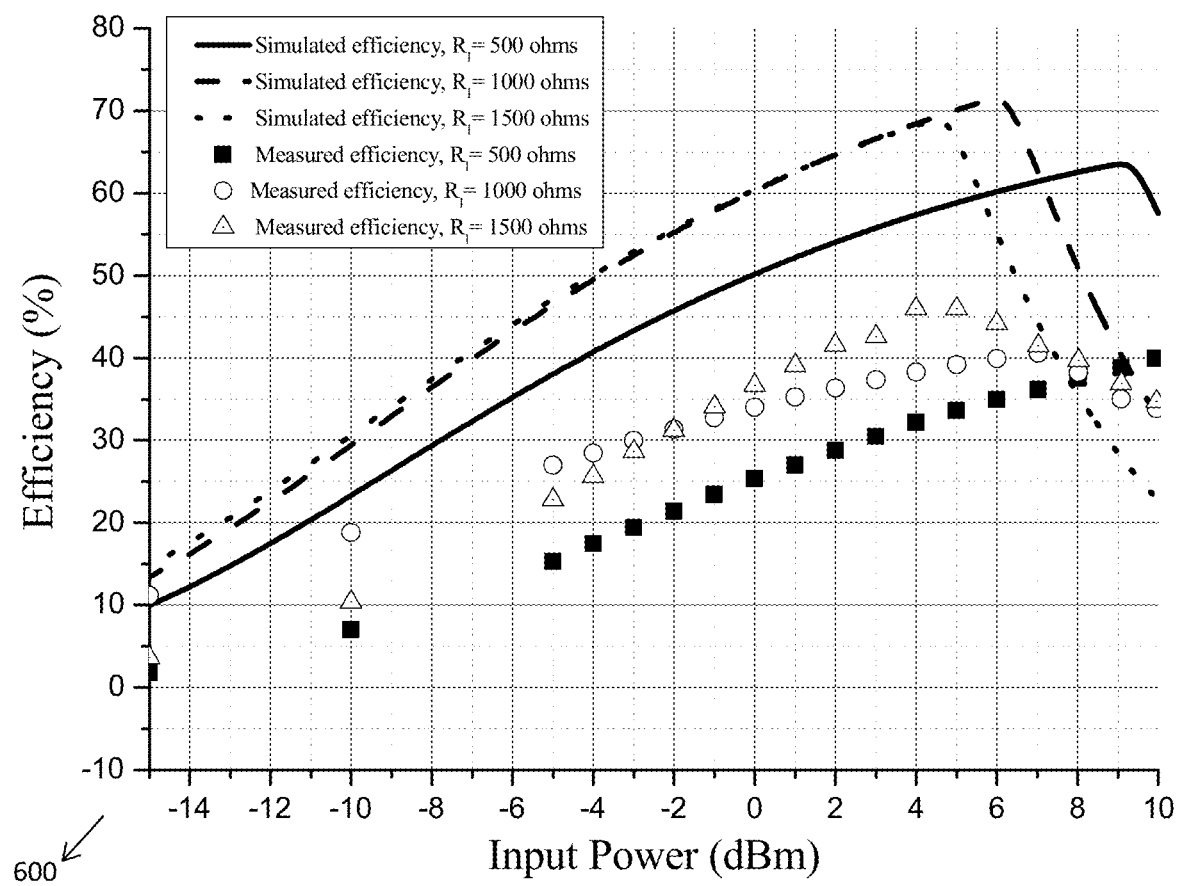
Figure 6A - Simulated and measured RF-DC conversion efficiency for various values of load resistance at f = 900MHz

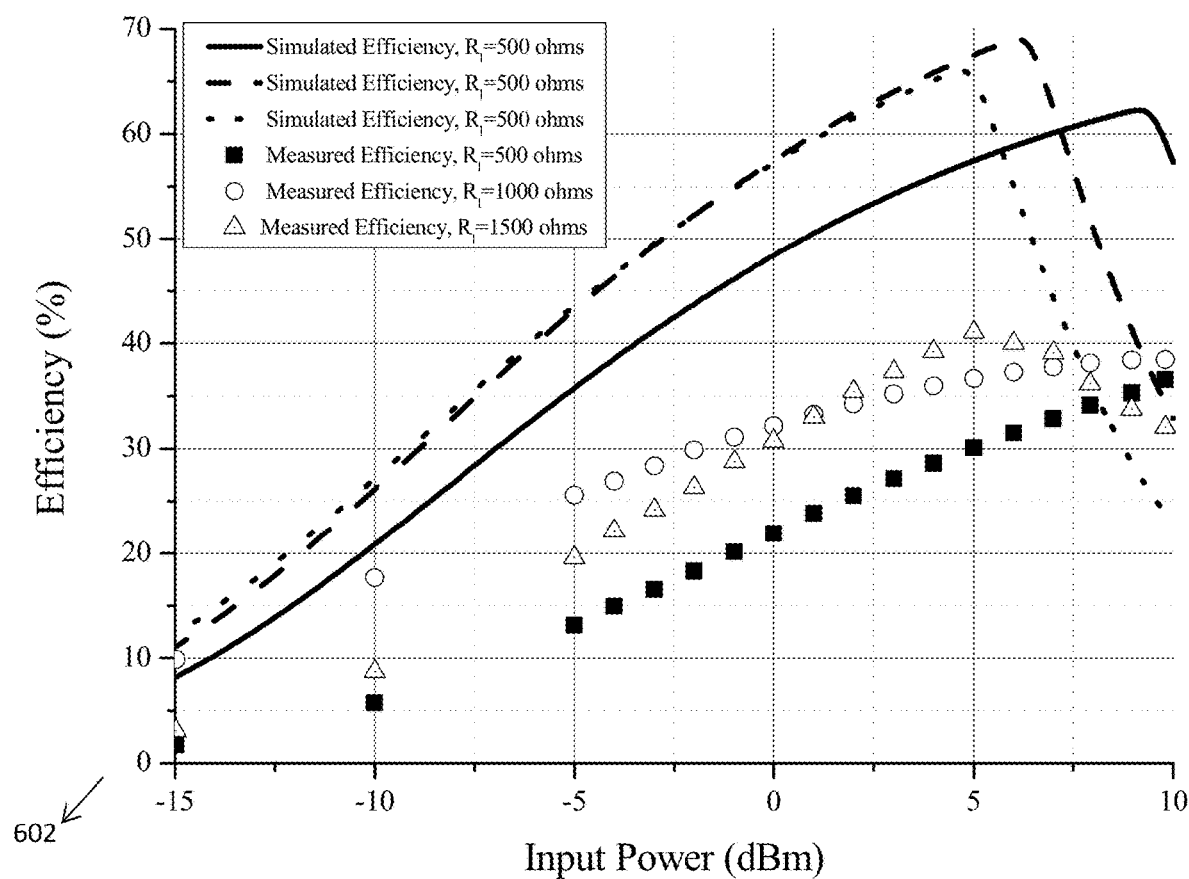
Figure 6B - Simulated and measured RF-DC conversion efficiency for various values of load resistance at f = 2.45GHz

US 11,024,970 B2

CIRCULARLY POLARIZED ANTENNA FOR RADIO FREQUENCY ENERGY HARVESTING

CROSS REFERENCE TO RELATED APPLICATIONS

This application is a National Stage application under 35 U.S.C. § 371 of PCT Application No. PCT/SG2018/050399, filed Aug. 6, 2018, and published on Feb. 14, 2019 as WO 2019/032047A1, entitled "A Circularly Polarized Antenna for Radio Frequency Energy Harvesting", which claims priority to Singapore Application No. 10201706417P, filed Aug. 7, 2017, entitled "Dual-band Circularly Polarized Microstrip Antenna for Energy Harvesting". The entire contents of WO 2019/032047A is hereby incorporated by reference herein in its entirety.

FIELD

The present solution relates to a circularly polarized antenna for Radio Frequency energy harvesting, for example, a dual band circularly polarized antenna for Radio Frequency (RF) energy harvesting.

BACKGROUND

Energy harvesting, also known as energy scavenging is a method that converts surrounding electromagnetic waves into electrical energy. Recently, there is an increase in the literature in Radio Frequency (RF) energy harvesting application in areas such as low power wireless sensors, radio frequency identification (RFID) tags, and biotelemetry. Periodic battery replacements for large amount of sensor nodes are unrealistic and expensive. Hence, scavenging of ambient RF energy for wireless sensor network (WSN) is gaining popularity at least in the literature written on it.

Specifically, slotted circular microstrip disk antennas are described in, "*Comparative Study of Antenna Designs for RF Energy Harvesting*", Hindawi Publishing Corporation, International Journal of Antennas and Propagation, Publication Date: 2013, Authors: Sika Shrestha, Sun-Kuk Noh, and Dong-You Choi, Vol. 2013, Article ID 385260, and in, "*Compact Circularly Polarized Rectenna With Unbalanced Circular Slots*", IEEE Transactions on Antennas and Propagation, Vol. 56, No. 3, March 2008, Authors: Tzong-Chee Yo, Chien-Ming Lee, Chen-Ming Hsu, and Ching-Hsing Luo. A microstrip patch antenna with irregular slots is proposed in, "*A new compact size microstrip patch antenna with irregular slots for handheld GPS application*" University of Iraq, Eng. & Technology, Vol. 26, No. 10, Published in 2008, Author: Jawad K. Ali. However, these 3 literatures describe antennas working in a single band and the gain achieved by each of the proposed antennas is less than 5.0 dBic.

SUMMARY

According to an example of the present disclosure, there are provided a method and apparatus as claimed in the independent claims. Some optional features are defined in the dependent claims.

BRIEF DESCRIPTION OF THE DRAWINGS

Examples of the present disclosure will be better understood and readily apparent to one skilled in the art from the following written description, by way of example only and in conjunction with the drawings, in which:

FIG. 1A illustrates a cross-sectional view of an antenna based on an example of the present disclosure.

FIG. 1B illustrates a top view of a stacked slotted-circular-patch (SCP) in FIG. 1A.

FIG. 1C illustrates a top view of a tapered-slit-octagon patch (TSOP) in FIG. 1A.

FIG. 1D illustrates a top view of a microstrip feed line in FIG. 1A.

FIG. 1E illustrates a photograph of a top view of a prototype antenna according to an example of the present disclosure.

FIG. 2A illustrates measured and simulated return loss of the antenna of FIG. 1A.

FIG. 2B illustrates measured and simulated axial-ratio at the boresight of the antenna of FIG. 1A.

FIG. 2C illustrates measured and simulated gain at the boresight of the antenna of FIG. 1A.

FIG. 3A illustrates a dual band rectifier with a voltage doubler circuit configuration according to an example of the present disclosure.

FIG. 3B illustrates a dual-band composite right/left handed (CRLH) transmission line (TL) impedance matching circuit according to an example of the present disclosure.

FIG. 3C shows a specific configuration of the composite right/left handed (CRLH) transmission line (TL) impedance matching circuit of FIG. 3B.

FIG. 4 shows a graph regarding reflection coefficient of the rectifier of FIG. 3A.

FIG. 5 shows a photograph of a top view of a prototype dual band circularly polarized (CP) rectenna according to an example of the present disclosure.

FIG. 6A shows a graph regarding simulated and measured RF-DC conversion efficiency for various values of load resistance at f=900 MHz for a dual band rectenna according to an example of the present disclosure.

FIG. 6B shows a graph regarding simulated and measured RF-DC conversion efficiency for various values of load resistance at f=2.45 GHz for a dual band rectenna according to an example of the present disclosure.

DETAILED DESCRIPTION

Figure 2D:
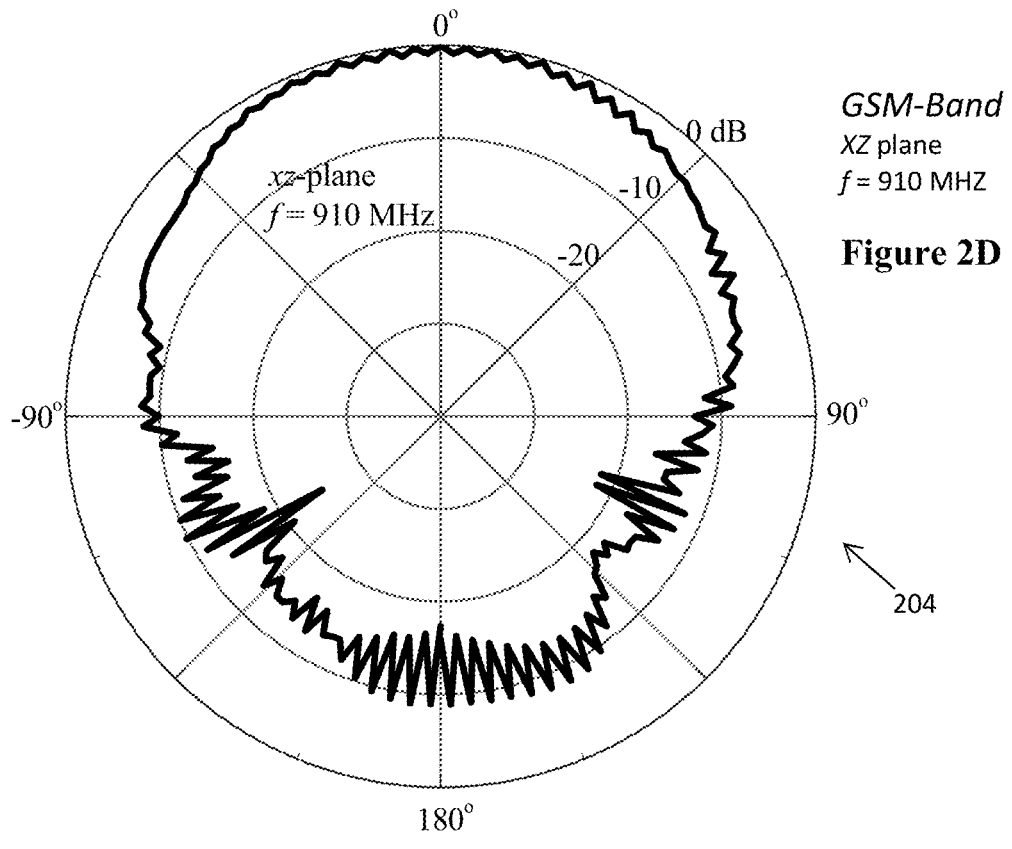
FIG. 2D illustrates a normalized radiation pattern for plane xz at 910 MHz of the antenna of FIG. 1A.

Typically, a Radio Frequency (RF) harvester will harvest ambient RF energy and store the energy in micro-batteries to power the WSN. With advances and popularity of wireless communication devices, large amount of abundant RF energy from surrounding sources are scattered in our environment. Using an appropriate antenna, these electromagnetic waves can be converted into electrical energy. There is present a challenge in that linearly polarized antenna receives only noise signals when the antenna is not aligned with the existing electromagnetic waves. Also, ambient electromagnetic waves may exist in all sorts of orientation and polarization. Therefore, an example of the present disclosure proposes a circularly polarized (CP) antenna for RF energy harvesting application. A CP antenna is insensitive to multi-path effects and is able to harness RF energy regardless of the orientation of the device comprising the CP antenna. In the example, a dual band CP rectenna is proposed to harvest RF energy at GSM (Global System for Mobile communication) and WiFi (Wireless Fidelity) bands over a wide coverage efficiently. In the present disclosure, GSM (Global System for Mobile communication) band and WiFi (Wireless Fidelity) band refer to GSM frequency band and WiFi frequency band respectively. The CP rectenna has been shown can receive most of the ambient RF energy/waves (linearly polarized, circularly polarized, elliptically polarized, slanted polarized waves) from the surrounding/environment.

When harvesting RF energy at the UHF band, there is a need for size reduction to let the RF energy harvesting apparatus or system remain compact. Symmetrical-slit and asymmetrical-slit methods are examples of the present disclosure proposed to achieve apparatus or system size reduction to handle energy harvesting from CP radiation or RF signals. It has been observed that a truncated corners CP microstrip antenna does not offer size reduction to a radiator for energy harvesting while asymmetric-slit microstrip antenna can be used for size reduction to handle energy harvesting from CP radiation or RF signals.

An example of the present disclosure provides a compact dual-band circularly polarized (CP) antenna for energy harvesting. Specifically, the antenna is a multilayered stacked dual-band compact CP microstrip antenna with wide coverage along with a metamaterial based rectifier. Specifically, in the present example, the metamaterial based rectifier is a compact dual band rectifier that comprises a dual band matching network realized using a Composite Right/Left Hand (CRLH) transmission line based circuit, which constitutes the metamaterial. The antenna is proposed for RF energy harvesting applications operating at the GSM and Wi-Fi bands.

The antenna of the present example further comprises a tapered-slit-octagon patch (TSOP) with a proximity coupled-feed and stacked slotted-circular-patch (SCP) fed by a metallic-via (i.e. electrical connection) connecting to a microstrip feed line. The TSOP is constructed by embedding eight tapered-slits arranged symmetrically on the octagon patch along octagonal axes from a center of the patch to reduce the patch size and to generate two orthogonal modes with equal magnitude for CP radiation or RF signals. Each of the eight tapered-slits has different length, and the tapered slits have a gradual length reduction among them. In one example, a tapered slit's length is reduced by about 6.25% of a length of an adjacent tapered slit. In one example, the minimum length reduction percentage between two tapered slits (not necessary adjacent to each other) of the TSOP is 0%. The maximum length reduction percentage between two tapered slits (not necessary adjacent to each other) of the TSOP is 44%. In another example, one tapered slit may have no length reduction or 0% length reduction, the maximum tapered slit length reduction for one tapered slit is 43.75% length reduction, and there is a gradual length reduction percentage of 6.25% between every two adjacent tapered slits. The gradual length reduction percentage between every two adjacent tapered slits may range from 0% to 6.35%.

In the present example, the SCP is constructed by two asymmetric-circular slots with, for example, a ratio of 1:6 embedded diagonally on the circular patch to generate two orthogonal modes with equal magnitude for CP radiation or RF signals. A dual-band composite right/left handed (CRLH) based rectifier operating at 900 MHz and 2.45 GHz may be assembled using a dual-band matching circuit and a voltage doubler circuit. The dual-band matching circuit may be designed using a compact CRLH transmission line (TL) that is able to produce two different phase shifts at two different frequencies. In the present example, the antenna can achieve measured gain of more than 5.2 dBic across the band of 908.0 MHz-922.0 MHz and gain of more than 6.14 dBic across the band of 2.35 GHz-2.50 GHz with peak gains of 5.41 dBic at 918.0 MHz and 7.94 dBic at 2.485 GHz. An overall antenna volume of the present example is $0.36\lambda_0 \times 0.36\lambda_0 \times 0.026\lambda_0$ ($\lambda_0$ is free space wavelength at 900 MHz). The rectifier size is $0.18\lambda_0 \times 0.075\lambda_0 \times 0.0002\lambda_0$ at 900 MHz and measured RF-DC conversion efficiency is 43% at 900 MHz and 39% at 2.45 GHz.

In summary, the present example provides a slit-patch radiator i.e. the TSOP for wide coverage receipt of RF signals at GSM band and a slotted-patch radiator i.e. the SCP is for receiving RF signals at WiFi band. An advantage of the present example is that a wide-coverage is achieved at GSM band due to the slits in patch radiator i.e. the TSOP.

FIG. 1A illustrates a cross-sectional view of the antenna 100 based on the aforementioned example.

In the present example, the antenna 100 may be configured with an overall antenna size (volume) of 120.0 mm (length)×120.0 mm (width)×8.6 mm (height). The antenna 100 comprises three substrates, a top substrate 101, a middle substrate 103 and a bottom substrate 105. The three substrates 101, 103 and 105 in the present example are materials or dielectric materials suitable for antenna design. In the present example, the three substrates 101, 103 and 105 may be known as dielectric substrates. A SCP 102 ($R_0$=17.6 mm) is disposed on top of the top substrate 101. The top substrate 101 has a height of $h_1$=1.6 mm, dielectric constant of $\varepsilon_r$=3.4, and tan δ=0.002. A radiating TSOP 104 (with $L_a$=80.1 mm and $S_w$=4.0 mm; more details on these parameters will be provided later) is disposed on top of the middle substrate 103 (which can be regarded as an upper dielectric layer). Specifically, the TSOP 104 is disposed between the top substrate 101 and the middle substrate 103. The middle substrate 103 has a height of $h_2$=5.4 mm, dielectric constant of $\varepsilon_r$=3.4, and tan δ=0.002. A microstrip feed line 108 (of 50-Ω) with a width of 3.67 mm is printed top on the bottom substrate 105. Specifically, the microstrip feed line 108 is disposed between the middle substrate 103 and the bottom substrate 105. The bottom substrate 105 has a height of $h_1$=1.6 mm, dielectric constant of $\varepsilon_r$=3.4, and tan δ=0.002. The bottom substrate 105 is disposed above a ground plane 110. The SCP 102 is fed by a via 106 connecting the SCP 102 to the microstrip feed line 108. The TSOP 104 comprises a Via hole 112 for the via 106 to go through to connect the SCP 102 to the microstrip feed line 108 as the TSOP 104 is located between the SCP 102 and the microstrip feed line 108. The via 106 should not contact the TSOP 104. The design of the present example is such that the SCP 102 and TSOP 104 are being proximity coupled-fed by the microstrip feed line 108. The SCP 102 and the microstrip feed line 108 are connected but the TSOP 104 is not connected.

In FIG. 1A, the ground plane 110 covers entirely a bottom of the bottom substrate 105. In top view, the SCP 102 is centrally located at a center of the antenna 100. For example, FIG. 5 shows a clear top view that the SCP 102 may be located at such central location of the antenna 100. In the present example, the TSOP 104 is configured to span across almost close to an entire length and width of the antenna 100. In another example, a via hole 112 need not be provided and the via 106 may be routed around the TSOP 104 to connect the SCP 102 and the microstrip feed line 108 instead of going through the via hole 112.

FIG. 1B shows a top view of the SCP 102 of FIG. 1A. A vertical y axis and a horizontal x axis are shown in FIG. 1B to provide reference for the configuration of the SCP 102. The SCP 102 is circular in shape with a diameter of $2R_0$. The SCP 102 comprises two asymmetric-circular slots 114 and 116 centered at $c_1$ and $c_2$ respectively. The circular slot 114 has a diameter of $2r_1$ ($r_1$ being the radius). The circular slot 116 has a diameter of $2r_2$ ($r_2$ being the radius). The circular slots 114 and 116 are disposed with, for example, a ratio of 1:6, and disposed diagonally along a line 111 of symmetry of the SCP 102. The ratio 1:6 means, for instance, that if the circular slot 114 has a diameter of about 1 mm, the circular slot 116 would have a diameter of about 6 mm. The circular slots 114 and 116 are disposed on the SCP 102 such that two orthogonal modes with equal magnitude for CP radiation or RF signals would be generated. The line 111 forms an acute angle • with the y axis.

FIG. 1C shows a top view of FIG. 1A revealing the TSOP 104 located below the top substrate 101. The TSOP 104 is substantially octagonal in shape with a side to side length of $L_a$ and a side length of about $L_c$. Eight tapered-slits (hereinafter collectively or individually referenced using reference numeral 113) are each arranged symmetrically on the TSOP 104 at each of the eight respective octagonal axes stemming from a center T of the TSOP 104. Each of the eight octagonal axes intersects the center T of the TSOP 104 and a vertex of the TSOP 104. FIG. 1C shows one octagonal axis 116 of the eight octagonal axes. Each of the eight tapered-slits 113 is symmetrically disposed at each of the 8 vertices of the TSOP 104. A slit width $S_w$, which is a parameter for characterizing slit size, is a distance between a vertex of the TSOP 104 to a point of the TSOP 104 that is closest to the vertex. For example, $S_w$ is shown in FIG. 1C to be a distance between a vertex 120 to a point 118 of the TSOP 104 that is closest to the vertex 120.

Furthermore, each of the eight tapered-slits 113 is of different length from one another. The length of each of the eight tapered-slits in the present example is taken to be a distance from the respective vertex of the TSOP 104 to a point of the TSOP 104 that is along the octagonal axis intersecting the vertex and closest to the center T of the TSOP 104. For example, length of a slit at the vertex 120 is a distance from the vertex 120 to a point $P_8$ of the TSOP 104 that is along the octagonal axis 116 and closest to the center T of the TSOP 104. The tapered slits 113 are configured to have a gradual length reduction among them. For instance, in FIG. 1C, each of the eight tapered-slits has an apex point closest to the center T of the TSOP 104. The apex points are shown to be adjacent to one another in consecutive order of $P_1$ to $P_8$ in FIG. 1C. In the present example, the slit with $P_8$ has the shortest length and the slit with $P_1$ has the longest length. In one example, the tapered slit length of one tapered slit is a gradual reduction of about 6.25% of the length of an adjacent tapered slit. The via hole 112 of FIG. 1 is shown to be present between the slit with apex point $P_4$ and the slit with apex point $P_3$.

FIG. 1D shows a top view of FIG. 1A revealing the microstrip feed line 108 located below the bottom substrate 105. In FIG. 1D, length, L, and width, W, of the antenna 100 are shown. Length, S, and width, ml, of the microstrip feed line 108 are also marked out in FIG. 1D. The microstrip feed line 108 is an elongate line located about midway of the width, W, of the antenna 100 and a first end of the line 108 ends on one side of the antenna 100. The via 106 is located close to a second end of the line 108 opposite to the first end.

With reference to FIGS. 1A to 1D, the antenna design dimensions of the parameters marked out in FIGS. 1A to 1D and detailed information of the proposed antenna design of the present example are given in Tables I, II, and III below. The Figure in which the parameters can be found in or are featured in are indicated in the Tables. Equations for x and y refers to respective x and y coordinates taken with respect to the respective x and y axes found in FIGS. 1B and 1C respectively.

TABLE I

Slit and slot positions

| Reference | Points | Equations for x and y for respective x, y coordinates with reference to x and y axes respectively | x, y in mm |
|---|---|---|---|
| FIG. 1C | $P_1$ | $D_1 \times \cos(\pi/8), D_1 \times \sin(\pi/8)$ | 7.903, 3.274 |
| FIG. 1C | $P_2$ | $D_2 \times \cos(\pi/8), -D_2 \times \sin(pi/8)$ | 10.37, -4.297 |
| FIG. 1C | $P_3$ | $D_3 \times \sin(\pi/8), -D_3 \times \cos(\pi/8)$ | 5.32, -12.84 |
| FIG. 1C | $P_4$ | $-D_4 \times \sin(n/8), -D_4 \times \cos(\pi/8)$ | -6.343, -15.31 |
| FIG. 1C | $P_5$ | $-D_5 \times \cos(\pi/8), -D_5 \times \sin(\pi/8)$ | -17.78, -7.366 |
| FIG. 1C | $P_6$ | $-D_6 \times \cos(\pi/8), D_6 \times \sin(\pi/8)$ | -20.25, 8.389 |
| FIG. 1C | $P_7$ | $-D_7 \times \sin(\pi/8), D_7 \times \cos(\pi/8)$ | -9.412, 22.72 |
| FIG. 1C | $P_8$ | $D_8 \times \sin(\pi/8), D_8 \times \cos(\pi/8)$ | 10.44, 25.19 |
| FIG. 1B | $c_1$ | $-(R_0/2) \times \cos(•), (R_0/2) \times \sin(•)$ | -6.23, 6.23 |
| FIG. 1B | $c_2$ | $(R_0/2) \times \cos(•), -(R_0/2) \times \sin(•)$ | 6.23, -6.23 |

TABLE II

Slit distance equations for distances $D_1$ to $D_8$ found in Table I above

| Distance | Equations |
|---|---|
| $D_0$ | $((L_a/2)^2 + (L_c/2)^2)^{0.5}$ |
| $D_1$ | $((Tm + 0 \times M) \times D_0)/100$ |
| $D_2$ | $((Tm + 1 \times M) \times D_0)/100$ |
| $D_3$ | $((Tm + 2 \times M) \times D_0)/100$ |
| $D_4$ | $((Tm + 3 \times M) \times D_0)/100$ |
| $D_5$ | $((Tm + 4 \times M) \times D_0)/100$ |
| $D_6$ | $((Tm + 5 \times M) \times D_0)/100$ |
| $D_7$ | $((Tm + 6 \times M) \times D_0)/100$ |
| $D_8$ | $((Tm + 7 \times M) \times D_0)/100$ |

TABLE III

Parameter values

| Reference | Symbol | Value |
|---|---|---|
| FIG. 1B | $R_0$ | 17.6 mm |
| FIG. 1B | $r_1$ | 1.0 mm |
| FIG. 1B | $r_2$ | 6.1 mm |
| FIG. 1A | $h_1$ | 1.6 mm |
| FIG. 1A | $h_2$ | 5.4 mm |
| See FIG. 1C and Table II | $L_a$ | 82.1 mm |
| See FIG. 1C and Table II | $L_c$ | 34 mm |
| FIG. 1D | L | 120 mm |
| FIG. 1D | W | 120 mm |
| FIG. 1D | ml | 3.67 mm |
| FIG. 1D | S | 46.4 mm |
| See Table II | M | 6.25 |
| FIG. 1A | • | 45° |
| See Table II | Tm | 20 |

The values of the above-mentioned dimensions and parameters are optimized for one specific example of a dual band (GSM and WiFi) CP antenna. It should be appreciated that in other examples, the operating frequency can be tuned/changed within the GSM and WiFi bands, and correspondingly, there can be different variations in the values of the antenna design dimensions and parameters. FIG. 1E illustrates a photograph of a top view of a prototype antenna according to an example of the present disclosure. Specifically, the prototype antenna is a dual-band CP antenna. If the prototype antenna of FIG. 1E has the configuration of the example described with reference to FIGS. 1A to 1D, the SCP 102 of the antenna 100 of FIG. 1A, and $c_1$ and $c_2$, which are the centers of the two asymmetric-circular slots 114 and 116, would appear as marked out in FIG. 1E.

FIG. 2A shows a graphical comparison 201 of measured and simulated return loss of the dual-band CP antenna 100 with the design as described with reference to FIGS. 1A to 1D. Specifically, FIG. 2A shows a graphical comparison of measured and simulated return loss of the dual-band CP antenna 100 against frequency in GHz. In particular, the measured 10-dB return loss bandwidth of 46.0 MHz (889 MHz-935 MHz) and 165.0 MHz (2.360 GHz-2.525 GHz), and the simulated 10-dB return loss bandwidth 30.0 MHz (888 MHz-918 MHz) and 156.0 MHz (2.349 GHz-2.505 GHz). The graph shows a good agreement between simulated and measured return loss of the antenna 100.

FIG. 2B shows a graphical comparison 202 of measured and simulated axial-ratio at the boresight of the dual-band CP antenna 100 with the design as described with reference to FIGS. 1A to 1D. Specifically, FIG. 2B shows the measured and simulated axial ratio of dual-band CP antenna 100 against frequency in GHz. The Simulated 3-dB AR bandwidths are 12.0 MHz (893 MHz-905 MHz) and 20.0 MHz (2.41 GHz-2.43 GHz). The measured axial ratio data's in dual-band appears to follow the simulated curves.

FIG. 2C shows a graphical comparison 203 of measured and simulated gain at the boresight of the dual-band CP antenna 100 with the design as described with reference to FIGS. 1A to 1D. Specifically, FIG. 2C shows the measured and simulated gain of the dual-band CP antenna against frequency in GHz. It is observed that the antenna 100 exhibits a simulated gain of more than 5.5 dBic across the band of 900.0 MHz-910.0 MHz, and a gain of more than 6.8 dBic across the band of 2.360 GHz-2.550 GHz with peak gains of 5.57 dBic at 906.0 MHz and 7.87 dBic at 2.490 GHz. Furthermore, the antenna 100 exhibits the measured gain of more than 5.2 dBic across the band of 908.0 MHz-922.0 MHz and gain of more than 6.14 dBic across the band of 2.350 GHz-2.500 GHz with peak gains of 5.41 dBic at 918.0 MHz and 7.94 dBic at 2.485 GHz. Both measured and simulated gain data illustrate good agreement.

Figure 2E:
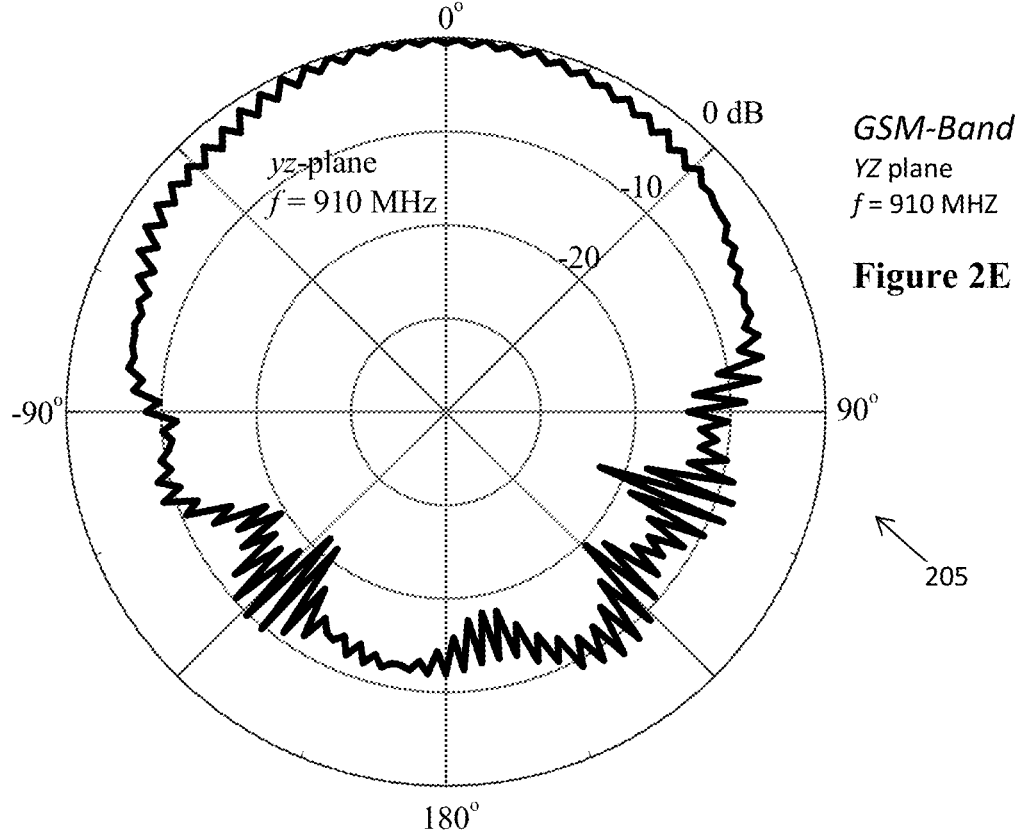
FIG. 2E illustrates a normalized radiation pattern for plane yz at 910 MHz of the antenna of FIG. 1A.
Figure 2F:
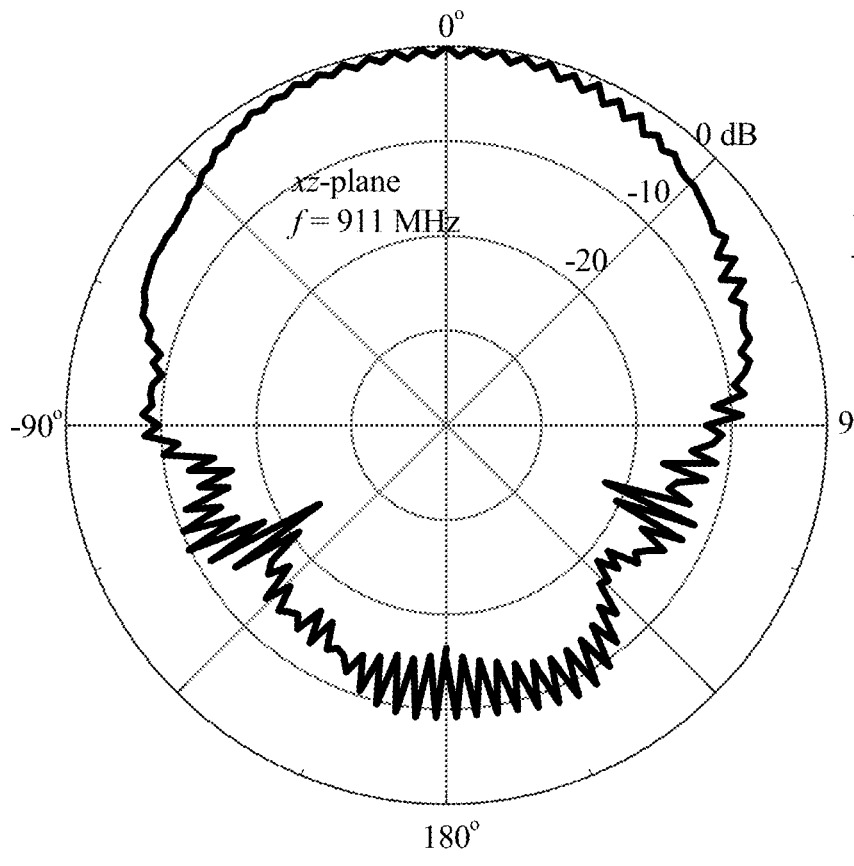
FIG. 2F illustrates a normalized radiation pattern for plane xz at 911 MHz of the antenna of FIG. 1A.
Figure 2G:
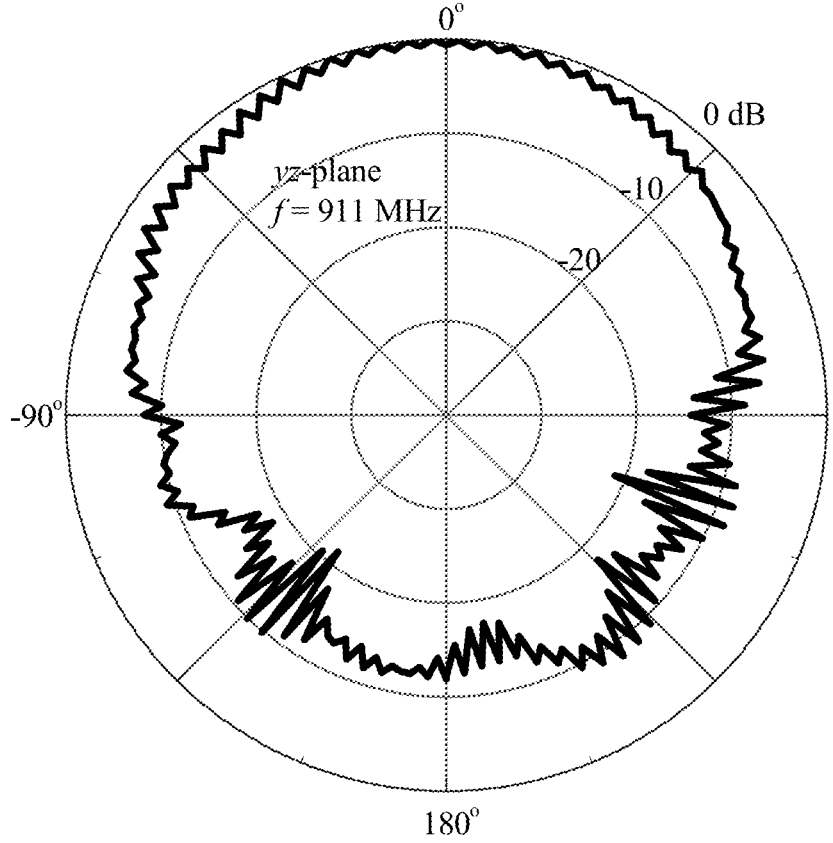
FIG. 2G illustrates a normalized radiation pattern for plane yz at 911 MHz of the antenna of FIG. 1A.
Figure 2H:
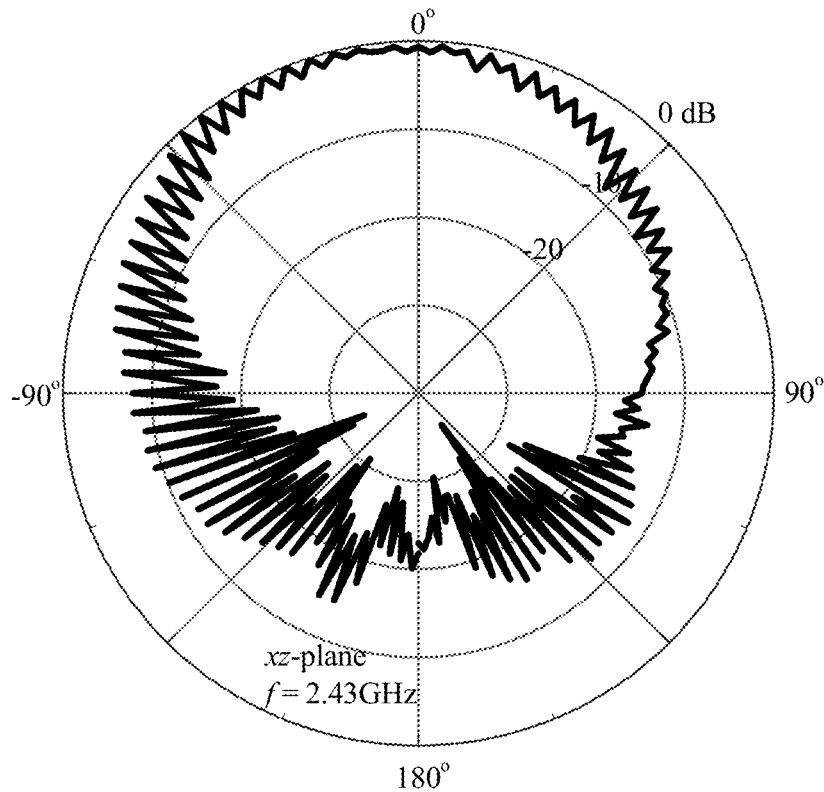
FIG. 2H illustrates a normalized radiation pattern for plane xz at 2.43 GHz of the antenna of FIG. 1A.
Figure 2I:
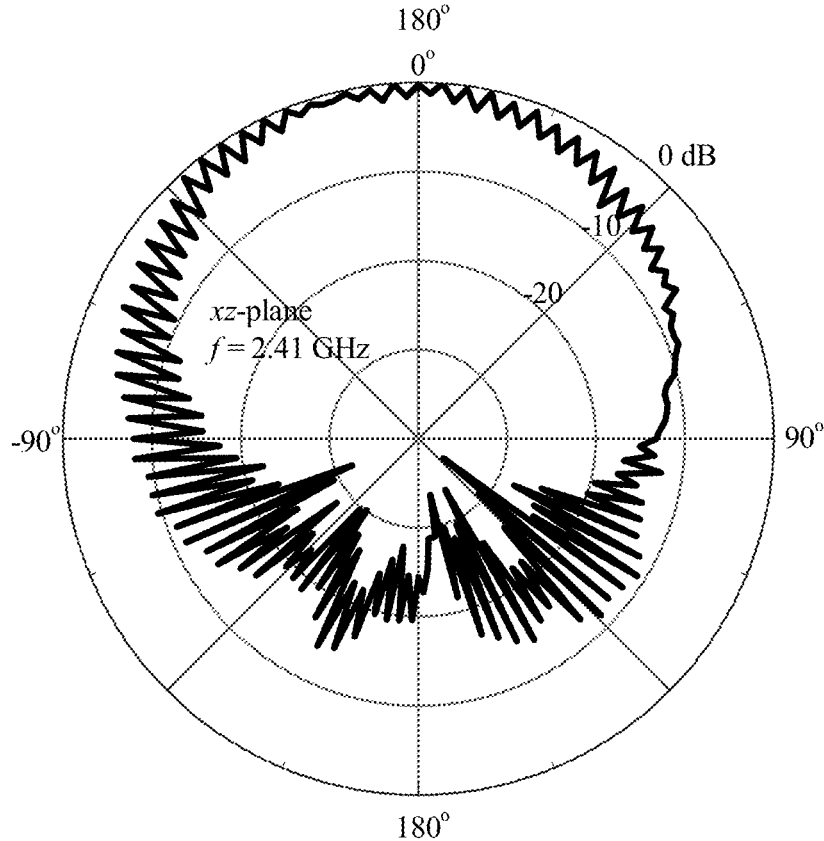
FIG. 2I illustrates a normalized radiation pattern for plane xz at 2.41 GHz of the antenna of FIG. 1A.

FIG. 2D to 2I shows measured normalized radiation patterns of the dual-band CP antenna 100 with the design as described with reference to FIGS. 1A to 1D at GSM-band and Wi-Fi band. Specifically, FIG. 2D shows a normalized radiation pattern 204 for planes xz at 910 MHz, with a 3-dB axial ratio beam width that is around 180° in the plane xz at GSM-band. FIG. 2E shows a normalized radiation pattern 205 for plane yz at 910 MHz, with a 3-dB axial ratio beam width that is around 180° in the plane yz at GSM-band. FIG. 2F shows a normalized radiation pattern 206 for plane xz at 911 MHz, with a 3-dB axial ratio beam width that is around 180° in the plane xz at GSM-band. FIG. 2G shows a normalized radiation pattern 207 for planes yz at 911 MHz, with a 3-dB axial ratio beam width that is around 180° in the plane yz at GSM-band. FIG. 2H shows normalized radiation pattern 208 at 2.43 band in a plane xz and good AR (less than 3 dB) can be seen at round boresight at Wi-Fi band. FIG. 2I shows a normalized radiation pattern 209 at 2.43 band a plane xz and good AR (less than 3 dB) can be seen at round boresight at Wi-Fi band.

FIGS. 3A to 3C illustrate an example of a dual-band rectifier structure and design that is proposed to work with the antenna 100 of FIGS. 1A to 1D. In the present example, the dual band rectifier 300 is designed to operate at 900 MHz and 2.45 GHz. It comprises a dual-band CRLH based impedance matching circuit 302 and a voltage doubler circuit 304. The dual-band CRLH based impedance matching circuit 302 is configured with a 2-unit cell CRLH TL constructed using a combination of microstrip line of electrical length and lumped components. The CRLH TL is of compact design and is able to produce two different phase shifts at two different frequencies i.e. 900 MHz and 2.45 GHz.

Specifically, FIG. 3A shows an example of the configuration of a voltage doubler circuit 304. The voltage doubler circuit 304 is connected to a power source comprising of the impedance matching circuit 302 and the antenna 100. In the present example, the power source is designed to operate at 900 MHz and 2.45 GHz. In the present example, the voltage doubler circuit 304 comprises a first capacitor C 301 of 100 pF. A first plate of the first capacitor C 301 is connected to the power source. A second plate of the first capacitor C 301 is connected to a first diode 303 (for example, SC7630) and a second diode 305 (for example, SC7630). The cathode end of the first diode 303 is connected to the second plate of the first capacitor C 301. The anode end of the first diode 303 is connected to ground. The anode end of the second diode 305 is connected to the second plate of the first capacitor C 301 and the cathode end of first diode 303. A first plate of the second capacitor C 307 of 100 pF is connected to ground and a second end of the second capacitor C 307 is connected to the second diode 305. The second end of the second capacitor C 307 is connected to the cathode end of the second diode 305 and a resistor R1 309 of 500 ohm. Output voltage $V_{out}$ 310 is across the resistor R1 309. A first end of the resistor R1 309 is connected to the second capacitor C 307 and a second end of the resistor R1 309 is connected to ground.

FIG. 3B shows an example of the configuration of the impedance matching circuit 302. The impedance matching circuit 302 comprises a first microstrip line 306 connected to the microstrip feed line 108 of the antenna 100. In one example, the first microstrip line 306 can be the microstrip feed line 108. A first plate of the third capacitor 2CI 311 is connected to the first microstrip line 306 and a second plate of the third capacitor 2CI 311 is connected to a first end of a first inductor LI 313. A second end of the first inductor LI 313 is connected to ground. The first end of the first inductor LI 313 and the second end of the third capacitor 2CI 311 are connected to a first plate of the fourth capacitor CI 315. A second plate of the fourth capacitor CI 315 is connected to a first end of a second inductor LI 317. A second end of the second inductor LI 317 is connected to ground. The first end of the second inductor LI 317 and the second end of the fourth capacitor CI 315 are connected to a first plate of a fifth capacitor 2CI 319. A second plate of the fifth capacitor 2CI 319 is connected to a second microstrip line 308. The second microstrip line 308 is connected to the first plate of the first capacitor C 301 of the voltage doubler circuit 304. The capacitance of each of the third capacitor 2CI 311 and fifth capacitor 2CI 319 is twice of that of the capacitance of the fourth capacitor CI 315. Each of the first microstrip line 306 and the second microstrip line 308 has no phase difference and their power angle $•_R$ are the same. Each of the first inductor LI 313 and the second inductor LI 317 has the same inductance value. FIG. 3C shows an example comprising proposed values for the components of the impedance matching circuit 302 of FIG. 3B. For example, the first microstrip line 306 and the second microstrip line 308 each has a length of 27.1264 mm and a width of 0.667 mm. The capacitance of the fourth capacitor CI 315 is 19.097 pF. The capacitance of each of the third capacitor 2CI 311 and fifth capacitor 2CI 319 is twice of that of the capacitance of the fourth capacitor CI 315. Each of the first inductor LI 313 and the second inductor LI 317 has the same inductance value of 127.86 nH.

FIG. 4 illustrates a graph 400 showing reflection coefficient S11 of the dual-band rectifier 300 described with reference to FIGS. 3A to 3C for an input power of 0 dBm. The reflection coefficient S11 is shown to be less than 20 dB at both the desired frequency bands (i.e. 900 MHZ and 2.45 GHz), which the dual-rectifier 300 is designed to operate in.

FIG. 5 shows a top view of a prototype of a rectifier with the antenna, which can be known as a circularly polarized rectenna 500. A rectenna refers to a rectifying antenna, which is a special type of receiving antenna that is used for converting electromagnetic energy into direct current (DC) electricity. If the circularly polarized rectenna 500 is configured according to the example described with reference to the antenna 100 of FIGS. 1A to 1D and dual band rectifier 300 of FIGS. 3A to 3C, the antenna 100, the SCP 102 of the antenna 100, and the dual band rectifier 300 would appear as marked up in FIG. 5.

An example of the present disclosure is a rectenna comprising the the antenna 100 of FIGS. 1A to 1D and dual band rectifier 300 of FIGS. 3A to 3C like the prototype of FIG. 5. FIG. 6A shows a graph 600 indicating simulated and measured RF-DC conversion efficiency for various values of load resistance i.e. $R_f$=500 ohms, 1000 ohms or 1500 ohms at GSM-band i.e. f=900 MHZ for such dual-band rectenna. The RF-DC conversion efficiency shown in FIG. 6A achieves more than 40% efficiency. FIG. 6B shows a graph 602 indicating simulated and measured RF-DC conversion efficiency for various values of load resistance i.e. $R_f$=500 ohms, 1000 ohms or 1500 ohms at Wi-Fi band i.e. f=2.45 GHz for such dual-band rectenna. The RF-DC conversion efficiency shown in FIG. 6B achieves more than 40% efficiency.

The proposed examples of the circularly polarized (CP) antenna described in the present disclosure or the more specifically described dual-band rectenna based on the various examples described herein may be implemented in low powered wireless sensors for harvesting ambient RF energy. The antennas of the proposed examples can be scalable for energy harvesting in other industrial, scientific and medical (ISM) radio bands like 400 MHz, 5.5 GHz and even 60 GHz. The solution might further find application in TV White space, GPS, UHF RFID and Chipless RFID in addition to just RF harvesting.

Although specific parameter values have been provided for examples of a circularly polarized (CP) antenna (e.g. 100 of FIGS. 1A to 1D) and a dual band rectifier (e.g. 300 of FIGS. 3A to 3C), it is appreciated that other examples are not limited to these specific parameter values and suitable values that would enable the circularly polarized (CP) antenna and dual band rectifier to work are also possible.

The proposed antenna in the examples of the present disclosure is low profile and miniature (i.e. compact). It has a dual-band high gain design (for example, greater than 5 dBic), wherein size and dimensions would be big issues. Therefore, the prospect and chances of the commercialization of such proposed antenna is high.

Examples of the present disclosure may have the following features.

A circularly polarized (CP) antenna (e.g. 100 of FIG. 1A) for Radio Frequency energy harvesting comprising: a top substrate (e.g. 101 of FIG. 1A); a bottom substrate (e.g. 105 of FIG. 1A) disposed on a ground plane (e.g. 110 of FIG. 1A); a middle substrate (e.g. 103 of FIG. 1A) disposed between the top substrate and the bottom substrate; a slotted patch (e.g. 102 of FIG. 1A) comprising more than one slots, the slotted patch being disposed on the top substrate; a slitted patch (e.g. 104 of FIG. 1A) comprising a plurality of slits (e.g. 113 of FIG. 1C), the slitted patch being disposed between the top substrate and the middle substrate; a microstrip feed line (e.g. 108 of FIG. 1A) disposed between the middle substrate and the bottom substrate; and a via (e.g. 106 of FIG. 1A) connecting the slotted patch and the microstrip feed line to enable the slotted patch to be fed by the microstrip feed line, wherein the more than one slots and the slits are arranged so as to generate more than one orthogonal modes with equal magnitude for receiving Radio Frequency (RF) signals.

The slitted patch (e.g. 104 of FIG. 1A) may comprise a via hole (e.g. 112 of FIG. 1A) for the via (e.g. 106 of FIG. 1A) to pass through the slitted patch.

The top substrate (e.g. 101 of FIG. 1A) and bottom substrate (e.g. 105 of FIG. 1A) may have same thickness and the middle substrate (e.g. 103 of FIG. 1A) may have a thickness thicker than the thickness of the top substrate and bottom substrate.

The slotted patch (e.g. 102 of FIG. 1A) may be a slotted-circular-patch comprising two circular slots (e.g. 114 and 116 of FIG. 1B).

The slotted patch may comprise two circular slots (e.g. 114 and 116 of FIG. 1B) with a size ratio of 1:6.

Each of the plurality of slits (e.g. 113 of FIG. 1C) may be tapered and the plurality of slits may be symmetrically arranged in the slitted patch (e.g. 104 of FIG. 1A).

The slitted patch (e.g. 104 of FIG. 1A) may be octagonal in shape and each of the plurality of slits (e.g. 113 of FIG. 1C) may be disposed at a location of a vertex (e.g. 120 of FIG. 1C) of the slitted patch.

Each of the plurality of slits (e.g. 113 of FIG. 1C) may be cut from an edge of the slitted patch (e.g. 104 of FIG. 1A) towards a center (e.g. T of FIG. 1C) of the slitted patch and the plurality of slits may be cut at different length from one another.

The plurality of slits (e.g. 113 of FIG. 1C) may have a difference in length of 0% to 6.35% between adjacent slits.

The received Radio Frequency (RF) signals may be in GSM (Global System for Mobile communication) band and/or WiFi (Wireless Fidelity) band.

A dual-band circularly polarized (CP) antenna (e.g. 100 of FIG. 1A) for Radio Frequency energy harvesting comprising: a top dielectric substrate (e.g. 101 of FIG. 1A); a bottom dielectric substrate (e.g. 105 of FIG. 1A) disposed on a ground plane (e.g. 110 of FIG. 1A); a middle dielectric substrate (e.g. 103 of FIG. 1A) disposed between the top dielectric substrate and the bottom dielectric substrate; a slotted-circular-patch (e.g. 102 of FIG. 1A) comprising two circular slots (e.g. 114 and 116 of FIG. 1B), the slotted-circular-patch being disposed on the top dielectric substrate; a tapered-slit-octagon patch (e.g. 104 of FIG. 1A) comprising eight tapered slits (e.g. 113 of FIG. 1C) of different lengths symmetrically arranged in the tapered-slit-octagon patch and each of the eight tapered slits is disposed at a location of a vertex (e.g. 120 of FIG. 1C) of the tapered-slit-octagon patch, the tapered-slit-octagon patch being disposed between the top dielectric substrate and the middle dielectric substrate; a microstrip feed line (e.g. 108 of FIG. 1A) disposed between the middle dielectric substrate and the bottom dielectric substrate; and a via (e.g. 106 of FIG. 1A) connecting the slotted-circular-patch and the microstrip feed line to enable the slotted-circular-patch to be fed by the microstrip feed line, wherein the slitted patch comprises a via hole (e.g. 112 of FIG. 1A) for the via to pass through the slitted patch, wherein the two circular slots and the eight tapered slits are arranged so as to generate two orthogonal modes with equal magnitude for receiving Radio Frequency (RF) signals in GSM (Global System for Mobile communication) band and WiFi (Wireless Fidelity) band, wherein the top dielectric substrate and bottom dielectric substrate have same thickness and the middle dielectric substrate has a thickness thicker than the thickness of the top dielectric substrate and bottom dielectric substrate.

A circularly polarized (CP) rectenna (e.g. 500 of FIG. 5) comprising: the aforementioned circularly polarized (CP) or dual-band circularly polarized (CP) antenna; a composite right/left handed (CRLH) transmission line (TL) impedance matching circuit (e.g. 304 of FIG. 3A); and a voltage doubler circuit (e.g. 302 of FIG. 3B or 3C).

The CRLH TL impedance matching circuit (e.g. 304 of FIG. 3A) may be configured to produce two different phase shifts at two different frequencies.

The CRLH TL impedance matching circuit (e.g. 304 of FIG. 3A) may comprise metamaterial based CRLH TL.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers.

While the invention has been described in the present disclosure in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

The invention claimed is:

1. A circularly polarized (CP) antenna for Radio Frequency energy harvesting comprising:
    a top substrate;
    a bottom substrate disposed on a ground plane;
    a middle substrate disposed between the top substrate and the bottom substrate;
    a slotted patch comprising more than one slots, the slotted patch being disposed on the top substrate;
    a slitted patch comprising a plurality of slits, the slitted patch being disposed between the top substrate and the middle substrate;
    a microstrip feed line disposed between the middle substrate and the bottom substrate; and
    a via connecting the slotted patch and the microstrip feed line to enable the slotted patch to be fed by the microstrip feed line,
    wherein the more than one slots and the slits are arranged so as to generate more than one orthogonal modes with equal magnitude for receiving Radio Frequency (RF) signals.

2. The circularly polarized (CP) antenna as claimed in claim 1, wherein the slitted patch comprises a via hole for the via to pass through the slitted patch.

3. The circularly polarized (CP) antenna as claimed in claim 1, wherein the top substrate and bottom substrate have same thickness and the middle substrate has a thickness thicker than the thickness of the top substrate and bottom substrate.

4. The circularly polarized (CP) antenna as claimed in claim 1, wherein the slotted patch is a slotted-circular-patch comprising two circular slots.

5. The circularly polarized (CP) antenna as claimed in claim 1, wherein the slotted patch comprises two circular slots with a size ratio of 1:6.

6. The circularly polarized (CP) antenna as claimed in claim 1, wherein each of the plurality of slits is tapered and the plurality of slits are symmetrically arranged in the slitted patch.

7. The circularly polarized (CP) antenna as claimed in claim 1, wherein the slitted patch is octagonal in shape and each of the plurality of slits is disposed at a location of a vertex of the slitted patch.

8. The circularly polarized (CP) antenna as claimed in claim 1, wherein each of the plurality of slits is cut from an edge of the slitted patch towards a center of the slitted patch and the plurality of slits is cut at different length from one another.

9. The circularly polarized (CP) antenna as claimed in claim 8, wherein the plurality of slits has a difference in length of 0% to 6.35% between adjacent slits.

10. The circularly polarized (CP) antenna as claimed in claim 1, wherein the Radio Frequency (RF) signals are in GSM (Global System for Mobile communication) band and/or WiFi (Wireless Fidelity) band.

11. A dual-band circularly polarized (CP) antenna for Radio Frequency energy harvesting comprising:
    a top dielectric substrate;
    a bottom dielectric substrate disposed on a ground plane;
    a middle dielectric substrate disposed between the top dielectric substrate and the bottom dielectric substrate;
    a slotted-circular-patch comprising two circular slots, the slotted-circular-patch being disposed on the top dielectric substrate;
    a tapered-slit-octagon patch comprising eight tapered slits of different lengths symmetrically arranged in the tapered-slit-octagon patch and each of the eight tapered slits is disposed at a location of a vertex of the tapered-slit-octagon patch, the tapered-slit-octagon patch being disposed between the top dielectric substrate and the middle dielectric substrate;
    a microstrip feed line disposed between the middle dielectric substrate and the bottom dielectric substrate; and
    a via connecting the slotted-circular-patch and the microstrip feed line to enable the slotted-circular-patch to be fed by the microstrip feed line,
    wherein the slitted patch comprises a via hole for the via to pass through the slitted patch,
    wherein the circular slots and the eight tapered slits are arranged so as to generate two orthogonal modes with equal magnitude for receiving Radio Frequency (RF) signals in GSM (Global System for Mobile communication) band and WiFi (Wireless Fidelity) band,
    wherein the top dielectric substrate and bottom dielectric substrate have same thickness and the middle dielectric substrate has a thickness thicker than the thickness of the top dielectric substrate and bottom dielectric substrate.

12. A circularly polarized (CP) rectenna comprising:
the antenna as claimed in claim 1;
a composite right/left handed (CRLH) transmission line (TL) impedance matching circuit; and
a voltage doubler circuit.

13. The circularly polarized {CP) rectenna as claimed in claim 12, wherein the CRLH TL impedance matching circuit is configured to produce two different phase shifts at two different frequencies.

14. The circularly polarized (CP) rectenna as claimed in claim 12, wherein the CRLH TL impedance matching circuit comprises metamaterial based CRLH TL.

* * * * *